United States Patent
Stahl et al.

[15] 3,642,258
[45] Feb. 15, 1972

[54] COLUMN TRAY

[72] Inventors: Gerhard Stahl, Doernigheim; Walter Spahn, Frankfurt am Main; Willi Fischer, Hanau; Franz Auth, Frankfurt am Main, all of Germany

[73] Assignee: Messer Griesheim GmbH, Frankfurt, Germany

[22] Filed: Oct. 6, 1969

[21] Appl. No.: 863,923

[30] Foreign Application Priority Data

Oct. 23, 1968 Germany......................P 18 04 591.5

[52] U.S. Cl. .........................................261/113, 261/114 R
[51] Int. Cl............................................................B01d 3/22
[58] Field of Search ..............................261/94, 95, 113, 114

[56] References Cited

UNITED STATES PATENTS 2,420,242  5/1947  Harmon.............................261/113 X
2,375,409  5/1945  Glitsch..............................261/114 X

FOREIGN PATENTS OR APPLICATIONS 344,041  3/1960  Switzerland..........................261/114

Primary Examiner—Tim R. Miles
Assistant Examiner—Steven H. Markowitz
Attorney—Paul W. Garbo

[57] ABSTRACT

An improved tray for rectifying and scrubbing columns is simply constructed by providing a cylindrical member coaxially within the column shell, placing beams radially between said member and shell, attaching one end of each beam to said member or shell, supporting the opposite free end of each beam on a ring fastened to the vertical surface adjacent to said free end, and fitting tray segments in locking arrangement between the beams which are circumferentially spaced from each other. The free ends of the beams supported on the ring, together with the locked-in tray segments, can move radially to accommodate differences in thermal expansion of the components of the column.

7 Claims, 3 Drawing Figures

PATENTED FEB 15 1972    3,642,258
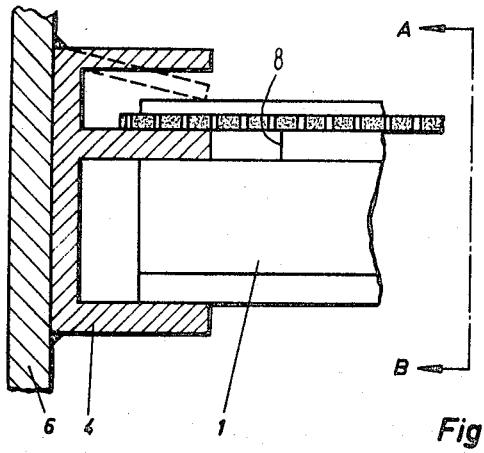
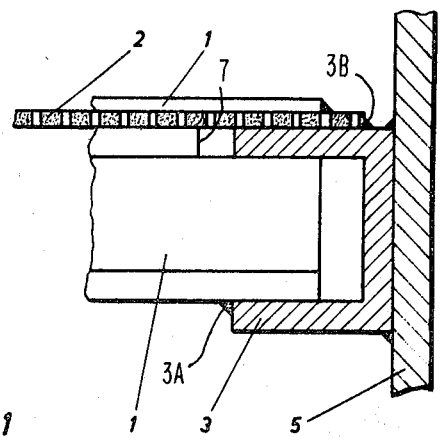
Fig. 1
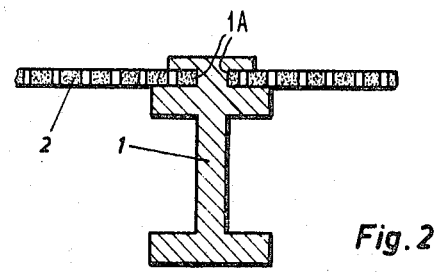
Fig. 2
Fig. 3
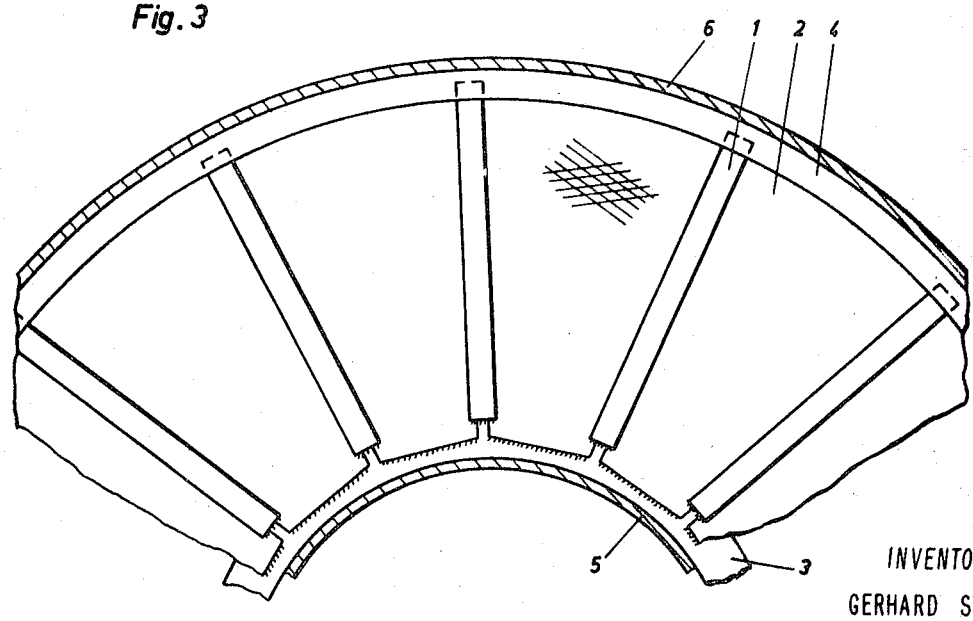
INVENTORS
GERHARD STAHL
WALTER SPAHN
WILLI FISCHER
FRANZ AUTH
BY Paul W. Garbo
AGENT

COLUMN TRAY

BACKGROUND OF THE INVENTION

The invention relates to a tray for rectifying and scrubbing columns.

In fabricating rectifying and scrubbing columns, one of the most difficult problems encountered consists of sealing the column tray against the column shell, in particular when attention must be paid to the difference in the thermal expansions of the column tray and the column shell during startup and shutdown operations. Even at a steady operating temperature, gaps may form which are large enough for the liquid to "rain through", when different materials with different thermal expansions are used for tray and shell. Furthermore, diameter tolerances must be taken into account, as well as the fact that the cylindrical shell of the column is not absolutely true to its center axis.

It is a known procedure to simply weld the trays into the column shell. For this, the diameters must be maintained rather accurately. In order to equalize the difference in thermal expansion, the tray must often be fitted with expansion rims. When it is welded-in, the tray may become warped and thus necessitate expensive and time-consuming realignment work.

One proven method for sealing column trays against the column shell consists of fitting the trays into a thin-walled protective shell, either between flanges held by spring rings, or between short column sections. With this procedure, however, there is danger of a leak developing between the protective shell and the outer shell so that an entire portion of the column may become effective due to a bypass.

The use of elastic sealing materials for sealing the edges of trays also presents problems when the liquid and gaseous media in the column attack the sealing materials or the temperatures are extreme.

It is furthermore a known method to weld rings into the column shell on which the trays are placed and clamped down. It is true that this permits a relative shifting between column tray and column shell, however, the installation is complicated and expensive. The usual procedure is to disassemble the trays into individual sections, position them in the column, and fasten them with clamping bolts, hook bolts, and similar hardware.

SUMMARY OF THE INVENTION

It is the object of this invention to simplify both the trays and the assembly thereof, where such trays are of the sectional-type supported on rings in the column.

In accordance with this invention, a column tray comprises several sections or segments held in support bars or beams which are disposed radially between a core element or tube and the column shell and are fastened at one end to the core tube or the column shell while the free ends, together with the tray segments held in the support bars, rest on a support ring so that they are radially movable.

It is expedient, but not absolutely necessary, that the ends of the support bars which are fastened to the core tube or to the column shell also be placed on and welded to a supporting ring. The tray segments too may be welded to this ring and this is particularly advantageous for the transportation of the assembled column. Of course, other methods of fastening may be used, if welding is not suitable due to a difference in materials, for instance.

Since the tray segments are loosely held in the radial bars, a complete tray is easily and quickly assembled by successively fitting together segments and bars. The final component is the downcomer. Then, the assembled tray is fastened to the core tube or to the column shell. The usual method will be to weld it to the inner support ring on the core tube. The tray then rests, radially movable, on the outer support ring on the column shell. It is necessary to fit the bars and segments together in such a way that there is surface contact between the segments and the outer support ring so that no liquid can rain through. In most cases, it is therefore necessary to secure the bars and segments against vertical shifting in relation to the outer support ring. This can be done in many different ways, e.g., most simply by providing the bars with recesses or cutouts which permit the bars to fit into the profile of the outer support ring.

Even with the tray thus secured against vertical movement, it can still happen during operation, that the tray flutters due to excessive clearance. This can be avoided, for example, by a support ring with an E-shaped profile. With the segments resting on the center arm of the E-profile, the upper arm can be hammered down toward the center arm. This will press down the segments and ensure in addition that they actually have surface contact with the support ring.

The advantages of this invention consist of very easy and quick assembly, use of a minimum of different components and fastening elements, and the possibility to use different materials for column tray and column shell. The tray has positive surface contact, gaps cannot form, and thermal expansion differences are easily absorbed.

An example of the invention will now be described in relation to the accompanying drawings.

BRIEF DESCRIPTION OF THE DRAWINGS

FIG. 1 is a side view of an installed support bar with associated elements shown in section;

FIG. 2 is a cross section of the bar with its associated segments, taken along line A-B of FIG. 1; and FIG. 3 is a partial top view of the column tray made up of the elements of FIGS. 1 and 2.

DESCRIPTION OF PREFERRED EMBODIMENT

In the drawings, each support bar 1 rests on outer support ring 4 and is welded to inner support ring 3 as shown at 3A. Support rings 3 and 4 are welded to core tube 5 and column shell 6, respectively. Beam 1 has lateral slots or grooves 1A into which perforated tray segments 2 are fitted during assembly. In this particular example, tray segments 2 are sieve plates, however, this invention is also applicable to bubble cap trays. To facilitate transportation of the column, tray segments 2 are tacked by welds 3B to inner support ring 3. The free ends of beams 1, along with segments 2, rest on outer support ring 4 with positive surface contact. The radial movability is guaranteed, whereas a vertical movement in relation to outer support ring 4 is not possible. FIG. 1 shows that the center arm of the E-profile of outer support ring 4 is necessary only for this purpose. The invention can also be carried out with simple profiles for outer support ring 4, such as an L- or T-profiles.

However, the E-profile shown in FIG. 1 is particularly advantageous since, after assembly of the tray, the upper horizontal flange or arm of support ring 4 with the E-profile can be hammered down on beams 1 and segments 2. This ensures that segments 2 have all-around surface contact with the center arm of the E-profile of outer support ring 4. In this way, the relative movability in a radial direction is maintained, gaps cannot form, and other clamping-type connections such as wedges and bolts which might become loose during operation are avoided.

As shown in FIG. 1, the portion of the I-shaped beam 1 immediately under tray segments 2 is cut away at each of the two ends of beam 1 to form recesses 7 and 8 into which extend, respectively, the upper arm of inner ring 3 and the middle arm of outer ring 4.

Of course, perforated tray segments 2 and beams 1 can be fastened to inner support ring 3 by means other than welding if this should be necessary because of different materials. It is also possible to omit inner support ring 3 entirely and to fasten beams 1 directly to core tube 5. Beams 1 and segments 2 can also, in an alternative construction, be fastened to outer support ring 4 and placed so as to be radially movable on inner support ring 3. Naturally, the invention is not limited to the form of the support beams or to the profiles of the support rings shown in the drawings. Rather, many variations of the suspension of the radial bars or beams in the support rings will be evident without departing from the scope of the invention. For instance, core tube 5 may be a solid cylindrical member.

What is claimed is:

1. An improved tray for a liquid-gas contacting column which comprises a cylindrical member coaxially disposed within the shell of said column, a plurality of beams arranged radially between said member and said shell, and beams having lateral slots and being circumferentially spaced from each other, one end of each of said beams being attached to said member or said shell, the opposite free end of each of said beams being supported on a ring attached to the vertical surface within said column adjacent to said free end, and a plurality of tray segments, each of said tray segments being fitted into said lateral slots in locking arrangement between an adjacent pair of said beams, the tray thus formed being radially movable on said ring to accommodate differences in thermal expansion of the components of said column.

2. The improved tray of claim 1 wherein the tray segments are attached to the cylindrical member or the shell to which one end of each beam is attached.

3. The improved tray of claim 1 wherein the free end of each beam is provided with a cutout to permit said free end to fit between two horizontal flanges of the ring whereby said free end is prevented from moving vertically.

4. The improved tray of claim 3 wherein the ring has a third horizontal flange which presses down against the tray segments.

5. The improved tray of claim 1 wherein the tray segments are perforated plates.

6. The improved tray of claim 1 wherein the end of each beam attached to the cylindrical member or the shell is attached to a second ring which is attached to said member or said shell.

7. The improved tray of claim 6 wherein the tray segments are perforated plates and wherein all components which are attached are so attached by welds.

* * * * *

UNITED STATES PATENT OFFICE
CERTIFICATE OF CORRECTION

Patent No. 3,642,258　　　　　　　　　Dated February 15, 1972

Inventor(s) Gerhard Stahl et al

It is certified that error appears in the above-identified patent and that said Letters Patent are hereby corrected as shown below:

Column 3, line 9, "and beams" should read -- said beams --.

Signed and sealed this 13th day of June 1972.

(SEAL)
Attest:

EDWARD M. FLETCHER, JR.　　　　　ROBERT GOTTSCHALK
Attesting Officer　　　　　　　　　Commissioner of Patents